United States Patent
Kirsch et al.

(10) Patent No.: US 6,300,795 B1
(45) Date of Patent: *Oct. 9, 2001

(54) MULTIPLE-BIT, CURRENT MODE DATA BUS

(75) Inventors: Howard C. Kirsch, Austin, TX (US); Ena Ku, Hsinchu (TW)

(73) Assignee: Vanguard International Semiconductor Corporation, Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 09/709,598

(22) Filed: Nov. 13, 2000

Related U.S. Application Data (62) Division of application No. 09/030,197, filed on Feb. 25, 1998.

(51) Int. Cl.[7] .............................. H03K 19/02; H04B 3/00
(52) U.S. Cl. ........................ 326/60; 326/59; 326/86; 326/90; 375/257; 375/288
(58) Field of Search ................................. 326/82, 86, 87, 326/90, 91, 30; 327/52, 65, 89

(56) References Cited

U.S. PATENT DOCUMENTS

| | | | |
|---|---|---|---|
| 4,481,625 | 11/1984 | Roberts et al. | 370/85 |
| 5,254,883 | 10/1993 | Horowitz et al. | 307/443 |
| 5,355,391 | 10/1994 | Horowitz et al. | 375/36 |
| 5,450,026 | 9/1995 | Morano | 326/84 |
| 5,604,450 | * 2/1997 | Borkar | 326/82 |
| 6,028,455 | * 2/2000 | Yamauchi | 327/52 |
| 6,037,798 | * 3/2000 | Hedberg | 326/30 |

OTHER PUBLICATIONS

"A3.3V 128mb Multilevel NAND Flash Memory for Mass Storage Application" Jung et al, Proceedngs International Solid States Circuit Conf. 1996 paper TP2.1.

(List continued on next page.)

Primary Examiner—Michael Tokar
Assistant Examiner—Vibol Tan
(74) Attorney, Agent, or Firm—George O. Saile; Stephen B. Ackerman; Billy Knowles (57) ABSTRACT

A current mode data communication system is disclosed. The current mode data communication system has a transmitter to simultaneously transmit two digital data bits. The two digital data bits are combined to form a current mode signal. The current mode signal has a first positive current, a second positive current, a first negative current and a first positive current. The current mode signal will be transmitted on a double bit current mode bus. Further the current mode communication system has a receiver coupled to the double bit current mode bus to receive the current mode signal and convert the current mode signal to a unextracted form of the two digital data bits. The output of the receiver is connected to a data extractor circuit extract the two digital data bits for the unextracted form of the two digital data bits.

8 Claims, 3 Drawing Sheets

OTHER PUBLICATIONS

"A 9.8mm$^2$ 3.3V 64mb Flash Memory with FN–NOR Type 4 level Cell" Oh Kawa et al, Proceedings International Solid States Circuits Conference, 1996, paper TIP2.3.

"A 3.4 Mbyte/sec Programming 3–Level NAND Flash Memory Saving 40% Die Size Per Bit" Tanaka et al, Symposium of VLSI Circuits, Digest of Technical Papers 1997, p 65–66.

"1Gb/s Current–Mode Bidirectional I/O Buffer" Sim et al, Symposium on VLSI Circuits Digest of Technical Papers, IEEE, 1997, p121–122.

"Current Mode Techniques for High Speed VLSI Circuits with Applications to Current Sense Amplifier for CMOS SRAMS" Seevinck et al, IEEE Journal of Solid State Circuits, vol. 26, No. 4, Apr. 1991, p525–535.

"A 1.6Gb/s Data Rate 1Gb Synchronous DRAM with Hierarchieal Square Shaped Memory Block and Distributed Bank Architecture", Nitta et al, Proceedings of the International Solid State Circuits Conference, SP 23.5, p302 1996.

* cited by examiner

$b1_{RX} = \bar{\alpha}$

FIG. 4a

FIG. 4b $b2_{RX} = \bar{\alpha} \cdot \bar{\beta} \cdot \bar{\beta}_{MID} + \alpha \cdot \beta_{MID}$

MULTIPLE-BIT, CURRENT MODE DATA BUS

This is a division of patent application Ser. No. 09/030,197, filing date Feb. 25, 1998, A Multiple-Bit, Current Mode Data Bus, assigned to the same assignee as the present invention.

BACKGROUND OF THE INVENTION

1. Field Of The Invention

This invention relate to systems and circuits for the transmission of multiple digital data bits simultaneously on a single transmission medium between a transmitter and a receiver. More particularly this invention relates to a current mode multiple bit data bus to transmit and receive multiple digital data bits on a single transmission medium.

2. Description of Related Art

Typically, when two or more signals are routed in parallel over significant distances a data bus structure is often used. These distances may be on the order of from 1 mm to more than 20 mm of aluminum metalization on semiconductor chips, to as much as a meter of wiring pattern on a printed circuit card, to many meters of transmission line cabling to cover long distances. Often the data bus will contain two wires per signal transmission to have a differential signal to improve speed of the bus.

The important parameters or "figures of merit" for a data bus include: bandwidth of data transmission (bits per wire per second), power consumed (especially the AC power consumed by charging and discharging the data bus capacitances), and chip area consumed per bit versus the length of the distance of the transmission. There has been much discussion in the literature that the speed of the data bus, rather than the intrinsic CMOS gate speed, dominates chip performance beyond about 0.35 $\mu$m technology. The reason that the transmission speed is the dominating factor is simply that the aluminum wires are getting narrower, and chips are simultaneously getting physically larger. So the total resistance of the wires is going up since the wires are becoming longer and narrower. In addition to the longer wire length the separation between metal lines is also getting smaller which further increases the capacitance between lines. The net change is that the wiring delay due to the resistive-capacitive delay is increasing. The above mentioned differential structure of bus allow smaller voltage swings and consequently fewer resistive-capacitive delays.

One known method for reducing wiring delays is to send the signal as a current rather than a voltage signal. In this case the voltage on the bus wire does not change drastically during the signal transition, but the current through the wire is modulated. Since the voltage is not changed, the resistive-capacitive delay is not a factor is the transmission time. The delay for the bus is now the inherent speed of light delay of the transmission medium, which will be much less than the resistive-capacitive delay. "Current Mode Techniques for High Speed VLSI Circuits with Application to Current Sense Amplifier for CMOS SRAM's" Seevinck et al., IEEE Journal of Solid State Circuits, Vol. 26, No. 4 April 1991, pp. 525–535 documents a simplified model with current mode propagation delays. An example of an application of these simplified models are shown in "A 1.6 Gb/s Data Rate 1 Gb Synchronous DRAM with Hierarchical Square Shaped Memory Block and Distributed Bank Architecture" Nitta et al., Proceedings of the International Solid State Circuits Conference, SP23.5, p 302, 1996.

In "1 Gb/s Current-Mode Bidirectional I/O Buffer", Sim et al., Symposium on VLSI Circuits Digest of Technical Papers, IEEE, 1997, a current mode bidirectional driver and receiver is disclosed. The circuit described is a simultaneous bidirectional buffer having low power consumption. The reduced voltage swing on the transmission line and low impedance node within the buffer allow for high bandwidth. The input and output circuits use current mode circuits to transfer the digital data across the transmission line.

U.S. Pat. No. 5,355,391 (Hororwitz et al.) describes a high speed bus system. The bus configuration places master devices at one end of an unterterminated transmission line and all slave devices distributed along the remaining length of the transmission line with the opposite end terminated. CMOS current mode drivers and receivers are implemented to allow low voltage swings on the transmission line.

U.S. Pat. No. 4,481,625 (Roberts et al.) describes a high speed data bus for communication between functional units of a very large computer system. The drivers and receivers that will allow communication between the functional units are operated in a current mode so that signal propagation on the bus encounters no significant discontinuity in line impedance when it passes an activated driver. Thus reflections are avoided and high speed bus "turn-around" is possible. The drivers and receivers are differential and the bus is configured as a "pseudo twisted pair" to even out any imbalances between line pairs.

U.S. Pat. No. 5,450,026 (Morano) describes a differential current mode bus driver that will couple input digital signals to a bus which is normally biased to one of the logic states. The bus driver will respond to a digital signal of the opposite logic state by connecting a current source to one lead of the bus and a current sink to the other lead of the bus. The bus is driven to a voltage level representing the opposite logic state. If the input is at the normally biased logic state, the driver disconnects the current source and sink from the bus and connects the current source and sink together. The bus remains biased to the first level.

U.S. Pat. No. 5,254,883 (Hororwitz et al.) discloses a current mode driver to transmit digital data to a bus. The current mode driver has transistor circuitry to control current on the bus and a variable level circuit that can adjust the current level on the bus. The user may adjust the level of the current on the bus.

The concept of using multiple signal levels to represent digital data is known in the art. The simultaneous bidirectional transmission of data on a bus as shown in Sim et al. is an example of using multiple signal levels to transmit two bits of digital data simultaneously on a single transmission medium between functional units.

"A 3.3V 128 Mb Multilevel NAND Flash Memory for Mass Storage Application", Jung et al. Proceedings International Solid States Circuit Conference, 1996, paper TIP2.1, describes a flash memory cell that uses four separate voltage levels to retain two bits of data. The peripheral circuitry encodes the digital data to the appropriate voltage level for storage in the memory cell. The peripheral circuitry then senses the voltage level for the memory cell and determines the combination of logic state for the digital data.

"A 98 mm$^2$3.3V 64 Mb Flash Memory with FN-NOR Type 4 Level Cell", Ohkawa et al. Proceedings International Solid States Circuit Conference, 1996, paper TIP2.3, discloses a 64 Mb flash memory that also uses 4 voltage levels to store two bits of digital data.

"A 3.4 M byte/Sec. Programming 3-Level NAND Flash Memory Saving 40% Die Size Per Bit" Tanaka et al. Symposium of VLSI Circuits, Digest of Technical Papers, 1997, pp 65–66, has three threshold level corresponding to a 0, 1, and 2 thus allowing a pair of memory cells to store three bits of digital data.

SUMMARY OF THE INVENTION

An object of this invention is to provide a digital communications system that can simultaneously transmit and simultaneously receive multiple digital data bits on a single transmission medium.

Another object of this invention is to combine multiple digital data bits to form a single current mode signal for transmission on a single transmission medium.

Further another object of this invention is to extract multiple data bits received from a single signal received from a single transmission medium.

Still another object of this invention is to provide a multiple-bit current mode driver where multiple digital data bits control the current level of a current mode signal on a transmission medium.

Still further another object of this invention is to provide a multiple-bit receiver and extraction circuit that will receive a single current mode signal, determine the current levels of the current mode signal and extract the multiple digital data bits for the current mode signal.

To accomplish these and other objects a current mode data communication system is described, which has a transmitter to simultaneously transmit two digital data bits. The two digital data bits are combined to form a current mode signal. The current mode signal has a first positive current, a second positive current, a first negative current and a second negative current. The current mode signal will be transmitted on a double bit current mode bus.

Further the current mode data communication system has a receiver coupled to the double bit current mode bus to receive the current mode signal and convert the current mode signal to an unextracted form of the two digital data bits. The output of the receiver is connected to a data extractor circuit extract the two digital data bits for the unextracted form of the two digital data bits.

DETAILED DESCRIPTION OF THE INVENTION

Figure 1:
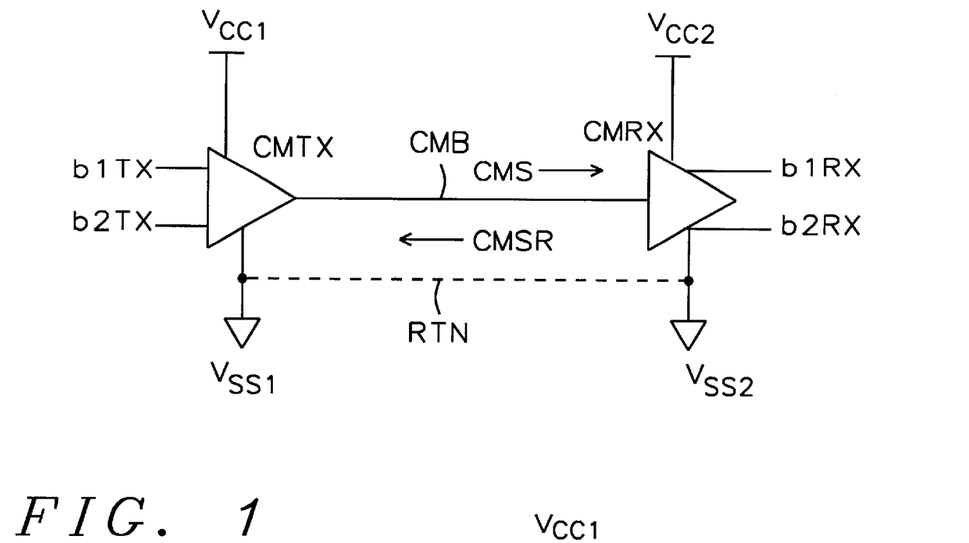
FIG. 1 is a schematic diagram of a multiple-bit current mode bus of this invention.

Refer now to FIG. 1 to understand the general structure of the multiple-bit current mode digital communication system of this invention. In this example two bits b1TX and b2TX are to be combined in the multiple bit transmitter CMTX to form the current mode signal.

Figure 2:
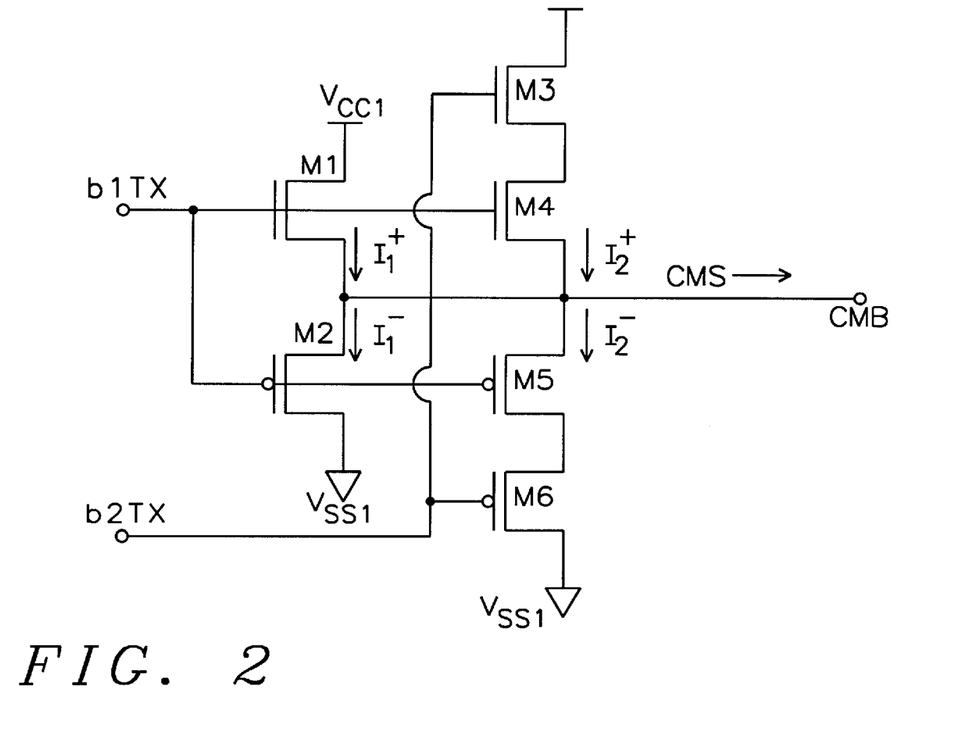
FIG. 2 is a schematic diagram of a multiple-bit current mode transmitter of this invention.

An embodiment of the multiple-bit current mode transmitter is shown in FIG. 2. The N-type Metal Oxide Semiconductor (MOS) transistor M1 and the P-type MOS transistor M2 have their gates coupled to the transmitter input terminal which contains the first bit b1TX of the two bits to be transmitted. The drain of the N-type MOS transistor M1 is connected to the high supply voltage source $Vcc_1$ and the drain of the P-type MOS Transistor M2 is connected to the low supply voltage source $Vss_1$. The sources of the N-type MOS transistor M1 and the P-type MOS transistor M2 are connected to the transmitter output terminal. The transmitter output terminal, as seen in FIG. 1 is connected to the current mode bus CMB.

The gates of the N-type MOS transistor M3 and P-type MOS transistor M6 are connected to the second bit b2TX of the two bits to transmitted. The drain of the N-type MOS transistor M3 is connected to the high supply voltage source $Vcc_1$ and the drain of the P-type MOS transistor M6 is connected to the low supply voltage source $Vss_1$.

The gates of the N-type MOS transistor M4 and the P-type MOS transistor M5 are connected to first bit b1TX of the two bits to be transmitted. The source of the N-type MOS transistor M3 is connected to the drain of the N-type MOS transistor M4. The source of the P-type MOS transistor M6 is connected to the drain of the P-type MOS transistor M5. The source of the N-type MOS transistor M4 and the P-type MOS transistor M6 are connected to the transmitter output terminal.

The current mode signal will be formed by appropriate summing of the currents $I_1^+$, $I_1^-$, $I_2^+$, and $I_2^-$. Table 1 shows the currents that compose the current mode signal CMS for combinations of the two digital data bits to be transmitted.

TABLE 1

| b2TX | b1TX | $I_1^+$ | $I_1^+$ | $I_2^+$ | $I_2^-$ | CMS |
|---|---|---|---|---|---|---|
| 0 | 0 | 0 | 0 | I | 0 | $I_1^- + I_2^-$ |
| 0 | 1 | I | 0 | 0 | 0 | $I_1^+$ |
| 1 | 0 | 0 | I | 0 | 0 | $I_1^-$ |
| 1 | 1 | I | 0 | I | 0 | $I_1^+ + I_2^+$ |

The magnitudes of the currents $I_1^+$, $I_1^-$, $I_2^+$, and $I_2^-$ are determined by the magnitude of the difference of the high supply voltage source and the low supply voltage source and the relative dimensions of the MOS transistors M1, M2, M3, M4, M5, and M6 of the multiple bit current mode transmitter. Table 2 shows the width to length ratios of the MOS transistors M1, M2, M3, M4, M5, and M6 for an implementation of this embodiment.

TABLE 2

| Transistor | Width | Length |
|---|---|---|
| M1 | 10 | 0.5 |
| M2 | 20 | 0.5 |
| M3 | 20 | 0.5 |
| M4 | 20 | 0.5 |
| M5 | 40 | 0.5 |
| M6 | 40 | 0.5 |

Given the width to length ratios of Table 2 the high supply voltage source $Vcc_1$ is 3.3 V and the low supply voltage source is 0V, the currents $I_1^+$, $I_1^-$, $I_2^+$, and $I_2^-$ will be each approximately 1ma.

Referring back to FIG. 1 the current mode signal CMS is placed on the current mode bus CMB for transmission to the current mode receiver CMRX. The low supply voltage source $Vss_2$ of the current mode receiver CMRX will be connected to the low supply voltage source $Vss_1$ of the transmitter CMTX. This will allow the return current CMSR to complete the circuit for the current mode signal CMS.

In an implementation of this embodiment of this invention where the current mode transmitter CMTX and the current mode receiver CMRX are on the same integrated circuit or the same printed circuit card, the high supply voltage sources $Vcc_1$ and $Vcc_2$ may actually be the same voltage sources. Also the low supply voltage sources $Vss_1$ and $Vss_2$ may also be the same voltage source, thus eliminating the requirement for the return path RTN.

Figure 6:
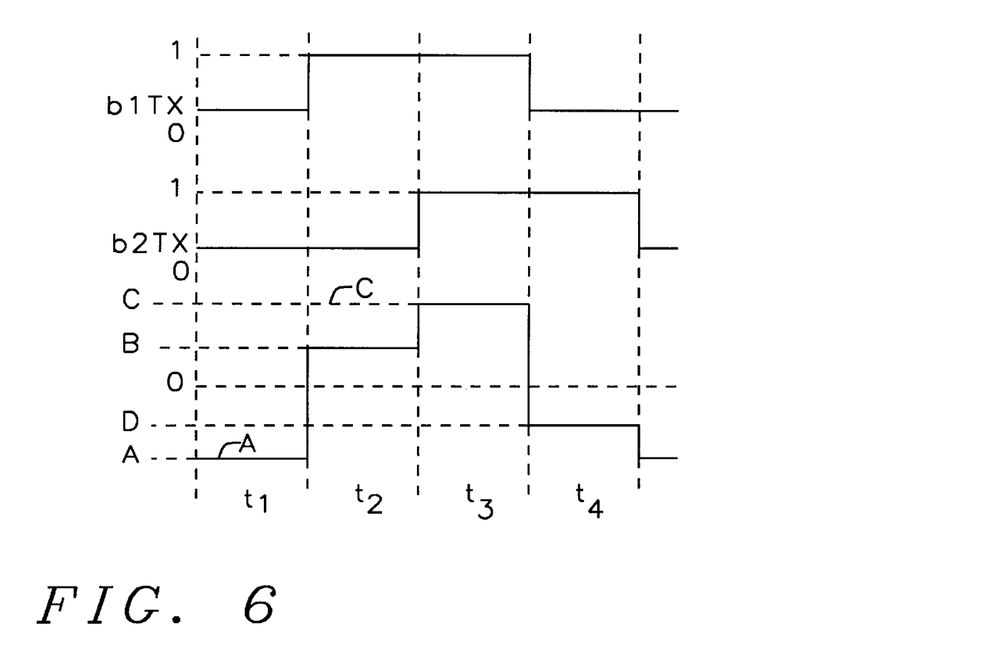
FIG. 6 is a plot of the current mode signal for each logic state of the multiple-bit digital signal of this invention.

Referring now to FIG. 6 to examine the current mode signal developed by the current mode transmitter CMTX. During the time period $T_1$, the first bit b1TX and second bit b2TX of the two bits to be transmitted are at the first logic state (0) and the current mode signal is at the current level A that is the sum of the current $I_1^-$ and $I_2^-$ of FIG. 2. At the time $T_2$, the first bit b1TX is at the second logic state (1) and the second bit b2TX remains at the first logic state (0). The current mode signal at time $T_2$ is at level B that is the current $I_1^+$.

At time $T_3$, the first bit b1TX is at the second logic state (1) and the second bit b2TX remains at the first logic state (0). The current mode signal is now at level C that is the sum of the $I_1^+$ and $I_2^+$ Finally at time $T_4$, the first bit b1TX is at the first state (0) and the second bit b2TX is at the second logic state (1). The current mode signal CMS is now at the level D that is the current $I_1^-$.

Referring back to FIG. 1, the current mode bus CMB is a transmission medium that is implemented as the aluminum metallurgy on a semiconductor chip, the printed wiring of a printed circuit card, or as a transmission line cabling between two separate computational functions.

The current mode signal CMS is received by the current mode receiver CMRX. The current mode receiver CMRX has a current receiver and an extractor logic circuit that is described hereinafter. The current mode receiver CMRX will receive the current mode signal CMS and convert it to an unextracted form α and β of the two digital data bits b1TX and b2TX. Table 3 shows the levels of the unextracted form α and β of the two transmitted data bits b1TX and b2TX.

TABLE 3

| b1TX | b2TX | α | β |
|------|------|---|---|
| 0 | 0 | 1 | 1 |
| 0 | 1 | 0 | Vref |
| 1 | 0 | 1 | Vref |
| 1 | 1 | 0 | 0 |

The mid level shown in table 3 is a level that is approximately half way between the first logic state (0) and the second logic state (1).

Figure 3:
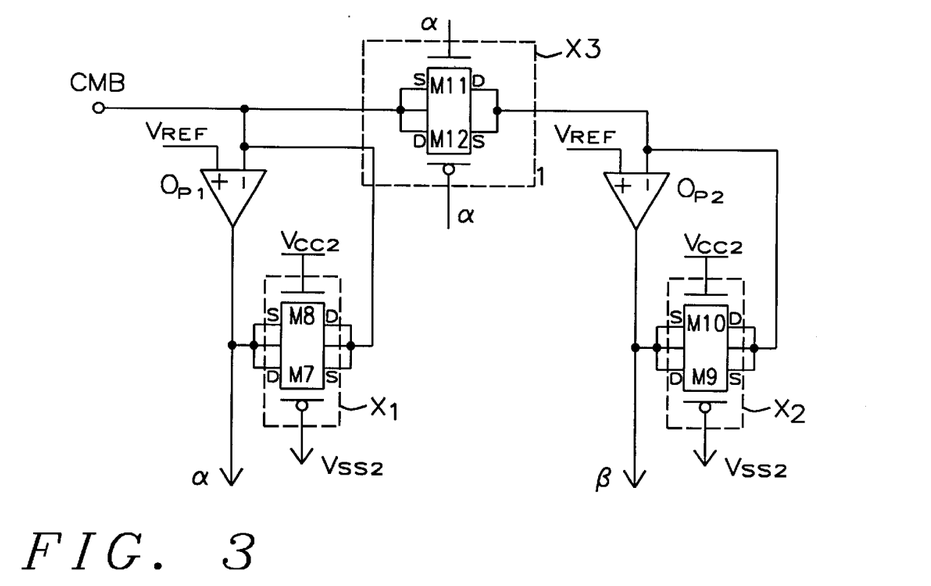
FIG. 3 is a schematic diagram of a multiple-bit current mode receiver of this invention.

Refer now to FIG. 3 for a detailed examination of the current mode receiver CMRX. The current mode bus CMB is connected to the input terminal of the current mode receiver. The input terminal is thereby connected to the inverting input (−) of the differential amplifier Op1. The noninverting input (+) of the differential amplifier Op1 is connected to a reference voltage source Vref. The reference voltage source Vref is approximately equal to one half the magnitude of the difference between the high supply voltage source $Vcc_2$ and the low supply voltage source $Vss_2$ of FIG. 1.

The input terminal is also connected to a transmission gate X1 formed by the N-type MOS transistor M8 and the P-type MOS transistor M7. The input terminal is connected to the drain of the N-type MOS transistor M8 and the source of the P-type MOS transistor M7. The gate of the N-type MOS transistor M8 is connected to the high supply voltage source $Vcc_2$, while the gate of the P-type MOS transistor M7 is connected to the low supply voltage source $Vss_2$. Having the gates of the N-type MOS transistor M8 and the P-type MOS transistor M7 biased as shown, causes the transmission gate X1 to act as a resistor. The output of the differential amplifier Op1 and the source of the N-type MOS transistor M8 and the drain of the P-type MOS transistor M7 are connected to the first output terminal a that is the first bit of the unextracted form of the two bit digital data.

The input terminal is also connected to the transmission gate X3. Transmission gate X3 is composed the N-type MOS transistor M11 and the P-type MOS transistor M12. The gates of the N-type MOS transistor M11 and the P-type MOS transistor M12 are connected to the output terminal α.

The drain of the N-type MOS transistor M11 and the source of the P-type MOS transistor M12 are connected to the receiver input terminal. As configured the transmission gate acts as a variable resistor, which has a first resistance if the logic state of the first unextracted data bit a is at the first logic state (0) and a second resistance if the unextracted data bit a is at a second logic state (1).

The output of the transmission gate X3 is formed by the source of the N-type MOS transistor M11 and the drain of the P-type MOS transistor M12. The io output of the transmission gate X3 is connected to the inverting input (−) of the differential amplifier Op2. The noninverting input (+) of the differential amplifier Op2 is connected to the reference voltage source Vref.

The output of the transmission gate X3 is connected to the input of the transmission gate X2. The input of the input of the transmission gate X2 is formed by the connection of the drain of the N-type MOS transistor M10 and the source of the P-type MOS transistor M9.

The gate of the N-type MOS transistor M10 is connected to the high supply voltage source $Vcc_2$ and gate of the P-type MOS transistor M9 is connected to the low supply voltage source. With the gates of the N-type MOS transistor M10 and the P-type MOS transistor M9 connected as described the transmission gate X2 will also act as a resistance.

The output of the transmission gate X2 is formed by the source of the N-type MOS transistor M10 connected to the drain of the P-type MOS transistor M9. The output of the transmission gate X2 is connected to the output of the differential amplifier Op2 and the second output terminal β containing the second unextracted data bit β.

The sub circuit consisting of the differential amplifier Op1 and the feedback transmission gate X1 formed by the N-type MOS transistor M8 and the P-type MOS transistor M7. The transmission gate X1 is always ON, so the output differential amplifier Op1 is resistively fed back to its noninverting input (−). This is a well known connection for feedback tracking circuits—the feedback tries to maintain the voltage V(−) at the inverting input terminal (−), equal to the voltage V(+) at the noninverting input terminal (+). For instance, if the voltage V(−) were greater than the voltage V(+), the output of the differential amplifier Op1 would swing negative, and current would flow through the transmission gate X1 to try to bring V(−) more negative. In the case of FIG. 3, this means that the differential amplifier OP1, the transmission gate X1 work together to try to hold the voltage V(−) equal the voltage V(+) equal to the reference voltage source Vref. The operation for differential amplifier Op2, and the transmission gate X2 is similar to that above described for the differential amplifier Op1 and the feedback transmission gate X1.

The current in the current mode bus CMB current is zero. Then the subcircuit composed of the differential amplifier Op1 and the feedback transmission gate X1 would be able to hold the voltage of the current mode bus V(CMB) equal to the reference voltage source Vref, as per the preceding discussion. In fact, in this state, no current needs to flow in transmission gate X1, so the voltage drop across transmission gate X1 is zero, and the voltage V($\alpha$) at the output of the differential amplifier Op1 is equal to the voltage V(CMB) of the current mode bus CMB which will be equal to the reference voltage source Vref. Given these bias voltages, the transmission gate X3 OFF, so the subcircuit differential amplifier Op2, and the transmission gate X2 is isolated from the current mode bus CMB, and is also able to hold the voltage V(−) at the inverting input (−) at the voltage reference source Vref with no current flowing in the transmission gate X2. So, the voltage V($\beta$) at the output of the differential amplifier Op2 is equal to the reference voltage source Vref, also. Thus, the voltage V($\alpha$) is equal to the voltage V($\beta$) is equal to the voltage V(CMB) of the current mode bus is equal to the reference voltage source Vref is the quiescent state of the circuit.

Now, if the current transmitter of FIG. 2 causes a current to flow in the current mode bus CMB, the consequence of the current is the attempt to change the voltage V(CMB) on the current mode bus CMB. For example, suppose $I^+_1$ is caused to flow from the high supply voltage source $Vcc_1$ into the current mode bus CMB. The voltage V(CMB) will tend to go positive. As soon as this happens, the change in bias for the differential amplifier Op1 will force the voltage V($\alpha$) at the output of the differential amplifier Op1 to go more negative to try to compensate the rise in the voltage V(CMB). The MOS transistors M1 and M7/M8 of the transmission gate X1 are ratioed such that the current caused by to b1TX going to the second logic level (1) is approximately equal to the current through the transmission gate X1 with the voltage V($\alpha$) at the output of the differential amplifier Op1 equal to the low supply voltage source $Vss_2$ and the voltage V(CMB) on the current mode bus CMB equal to the reference voltage source Vref. So the voltage V($\alpha$) at the output of the differential amplifier Op1 goes to near the low supply voltage source $Vss_2$ which causes P-type MOS transistor M12 to turn ON. However, the differential amplifier OP1, and the transmission gate X1 subcircuit has absorbed all the current from the current transmitter, therefore no current remains to pass through causes P-type MOS transistor M12. Thus the voltage V($\beta$) at the output of the differential amplifier Op2 remains undisturbed at the reference voltage source Vref. This state corresponds to the second line of Table 4, below, $\alpha$=0, $\beta$=Vref.

Now, suppose $I^+_2$ in FIG. 2 were added to $I^+_1$ because b2TX was brought the second logic level (1). Since we have chosen the first transmission gate X1 such that the voltage V($\alpha$) at the output of the differential amplifier Op1 is equal to the low supply voltage source $Vss_2$ response to the current $I^+_1$, there is no more current available from the differential amplifier OP1, and the transmission gate X1 to respond to the additional current $I^+_2$. That is, the subcircuit formed by the differential amplifier Op1 and the transmission gate X1 has reached its "compliant limit," and can sink no more current than $I^+_1$ from the current mode bus CMB. Since the P-type MOS transistor M12 is ON, the additional current $I^+_2$ will flow through it to activate the subcircuit formed by the differential amplifier Op2 and the transmission gate X2. This circuit responds in the symmetrically expected way by forcing the voltage V($\beta$) at the output of the differential amplifier Op2 to a more negative voltage in response to $I^+_2$.

Again, we size the P-type MOS transistor M9 and the N-type MOS transistor M10 so that when the voltage V($\beta$) at the output of the differential amplifier Op2 is equal to the low supply voltage source $Vss_2$, the current of approximately $I^+_2$ is flowing. So for the current mode bus CMB having a current of ($I^+_1$+$I^+_2$), we see that the voltage V($\alpha$) is equal to the voltage V($\beta$) is equal to the level of the low supply voltage source $Vss_2$, which is the third line in Table 4. That is $\alpha$=0, $\beta$=0.

Now, suppose $I^-_1$ is caused to flow to the high supply voltage source $Vss_1$ from the current mode bus CMB. The voltage V(CMB) will tend to go negative with respect to the reference voltage source Vref. As soon as this happens, the change in bias for the differential amplifier Op1 will force the voltage V($\alpha$) at the output of the differential amplifier Op1 to go more positive to try to compensate the decrease in the voltage V(CMB). The MOS transistors M2 and M7/M8 of the transmission gate X1 are ratioed such that the current caused by b1TX going to the first logic level (0) is approximately equal to the current through the transmission gate X1 with the voltage V($\alpha$) at the output of the differential amplifier Op1 equal to the high supply voltage source $Vcc_2$ and the voltage V(CMB) on the current mode bus CMB equal to the reference voltage source Vref. So the voltage V($\alpha$) at the output of the differential amplifier Op1 goes to near the high supply voltage source $Vcc_2$ which causes N-type MOS transistor M11 to turn ON. However, the differential amplifier OP1, and the transmission gate X1 subcircuit has sourced all the current to the current transmitter, therefore no current remains to pass through causes N-type MOS transistor M11. Thus the voltage V($\beta$) at the output of the differential amplifier Op2 remains undisturbed at the reference voltage source Vref. This state corresponds to the fourth line of Table 4, below, $\alpha$=1, $\beta$=Vref.

Now, suppose $I^-_2$ in FIG. 2 were added to $I^-_1$ because b2TX was brought the first logic level (0). Since we have chosen the first transmission gate X1 such that the voltage V($\alpha$) at the output of the differential amplifier Op1 is equal to the high supply voltage source $Vcc_2$ response to the current $I^-_1$, there is no more current available from the differential amplifier OP1, and the transmission gate X1 to respond to the additional current $I^-_2$. That is, the subcircuit formed by the differential amplifier Op1 and the transmission gate X1 has reached its "compliant limit," and can source no more current than $I^1_1$ to the current mode bus CMB. Since the N-type MOS transistor M11 is ON, the additional current $I^-_2$ will flow through it to activate the subcircuit formed by the differential amplifier Op2 and the transmission gate X2. This circuit responds in the symmetrically expected way by forcing the voltage V($\beta$) at the output of the differential amplifier Op2 to a more positive voltage in response to the current $I^-_2$. Again, we size the P-type MOS transistor M9 and the N-type MOS transistor M10 so that when the voltage V($\beta$) at the output of the differential amplifier Op2 is equal to the high supply voltage source $Vcc_2$, the current of approximately $I^-_2$ is flowing. So for the current mode bus CMB having a current of ($I^-_1$+$I^-_2$), we see that the voltage V($\alpha$) is equal to the voltage V($\beta$) is equal to the level of the high supply voltage is source $Vcc_2$, which is the first line in Table 4. That is $\alpha$=1, $\beta$=1.

Table 4 shows the logic levels for the unextracted data bits for each of the current levels A, B, C, and D of FIG. 6.

TABLE 4

| CMS | α | β |
|---|---|---|
| A ($I_1^+ + I_2^-$) | 1 | 1 |
| B ($I_1^+$) | 0 | midlevel |
| C ($I_1^+ + I_2+$) | 0 | 0 |
| D ($I_1^-$) | 1 | Midlevel |

Figure 4A:
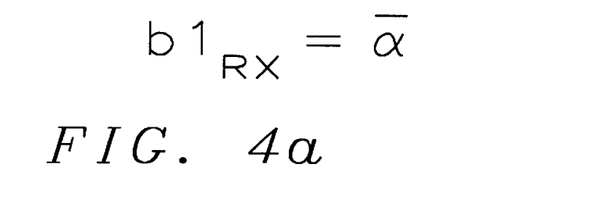
FIG. 4 is a diagram of the logic to extract the multiple data bits from the output of the multiple-bit current mode receiver of this invention.
Figure 4B:
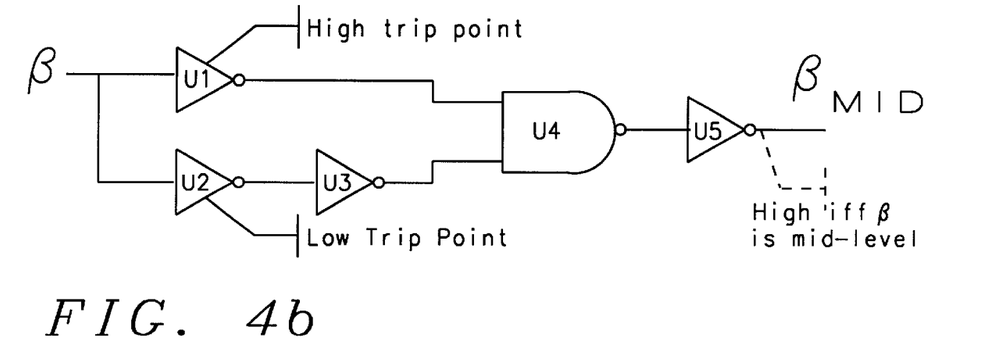
Figure 4C:
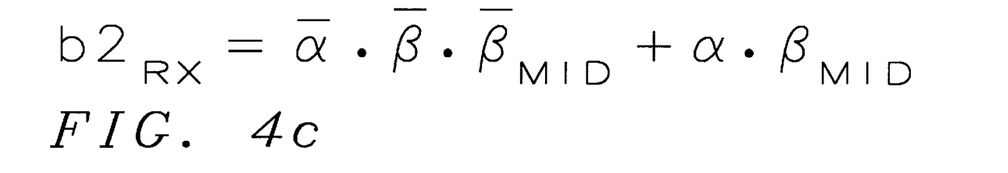

The output terminals α and β of the current receiver are connected to the input terminals of the extractor circuit as shown in FIG. 4a, 4b, and 4c. In FIG. 4a, the first data bit b1RX of the two data bits received is the logical NOT of the first unextracted data bit a and will be implemented as a simple inverter circuit.

The circuit to determine whether the second unextracted data bit β is at the midlevel is shown in FIG. 4b. The second terminal of the current receiver of FIG. 3 containing the second unextracted data bit β is connected to the input of the inverter buffer circuit U1. The inverting buffer circuit U1 is designed such that its output will not change state until the input has exceeded its a threshold trip point voltage. The threshold trip point voltage in this case will have a magnitude sufficiently greater than the midlevel between the first logic state (0) and the second logic state (1) such that the inverter U3 is guaranteed not to change state if the second unextracted data bit β is at the midlevel. However, it must have changed state (from the second logic state (1) to the first logic state (0) when the unextracted data bit β is at the second logic state (1).

The second output terminal containing the second unextracted data bit β is also connected to the input of buffer circuit formed by the inverters U2 and U3. In this case the buffer circuit formed by the inverters U2 and U3 is designed to have a trip point such that as soon as the input has exceeded a minimum level that defines the first logic state (0), the output of the buffer circuit formed by the inverters U2 and U3 will change state from the first logic state (0) to the second logic state (1). The threshold trip point will be designed such that the output will be guaranteed to be at the second level (1) before the input has reached the io midlevel between the first logic state (0) and the second logic state (1).

The NAND gate U4 and the inverter U5 will perform a logical AND and the output terminal will have a signal $β_{MID}$ that is at the second logic state (1) if and only if the second unextracted data bit has a value that is the midlevel between the first logic state (0) and the second logic state (1).

Finally to extract the second data bit b2RX of the two transmitted data bits refer to FIG. 4c. The second data bit b2RX will be the output of the circuit that performs the logic function as shown.

Figure 5:
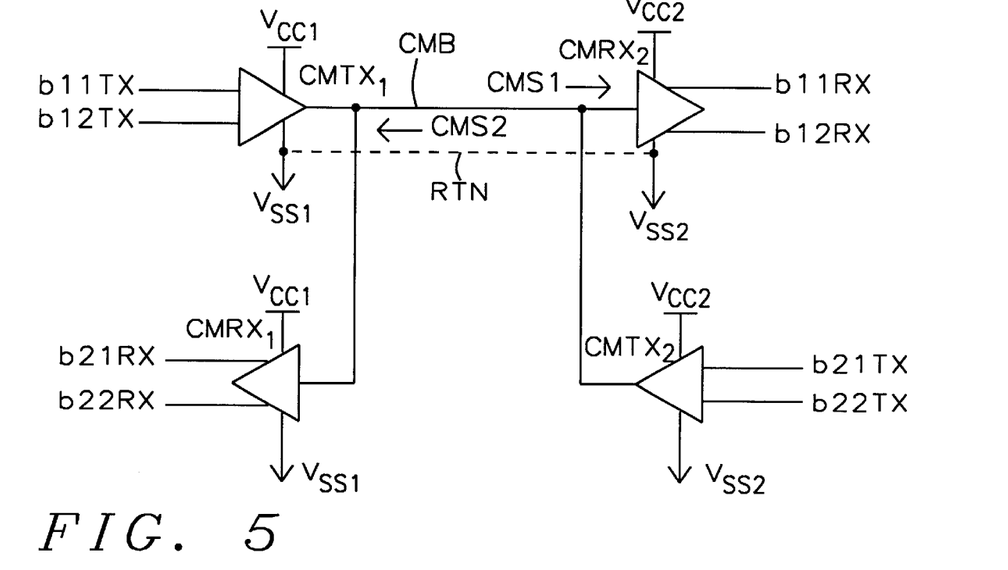
FIG. 5 is a schematic diagram of a multiple-bit bidirectional current mode bus of this invention.

Many digital communication systems have a requirement that there is communication between the functional units in both directions or bidirectionally on the same transmission medium. Refer now to FIG. 5 for a description of a multiple-bit bidirectional current mode digital communication system.

The multiple-bit bidirectional current mode communication system has transmitters $CMTX_1$ and $CMTX_2$ and receivers $CMRX_1$ and $CMRX_2$ coupled to each end of the current mode bus CMB. The transmitter $CMTX_1$ combines the two data bits b11TX and b12TX to form the current mode signal CMS1. The current mode signal CMS1 is received by the current mode receiver CMRX2. The current mode receiver CMRX2 will extract the digital data bits b11RX and b12RX from the current mode signal CMS1.

The current mode transmitter CMTX2 will combine the two digital data bits b21TX and b22TX to form the current mode signal CMS2. The current mode signal CMS2 is received by the current mode receiver $CMRX_1$. The current mode receiver $CMRX_1$ will then extract the two data bits b21RX and b22RX from the current mode signal CMS2.

In this embodiment, the current mode bus CMB must transmit data in one direction, cease transmission in the one direction and then start transmission in the opposite direction. For example if current mode transmitter CMTX1 is transmitting to current receiver CMRX2, current mode transmitter CMTX2 and current mode receiver CMRX1 must be quiescent. For current mode transmitter CMTX2 to transmit to the current mode receiver CMRX1, the current mode transmitter CMTX1 and current mode receiver CMRX2 must be brought to the quiescent state. The mode of communication is often called simplex transmission.

The current mode transmitters of FIG. 2 will be made quiescent by placing the inputs b1TX and b2TX both to a voltage that is within an MOS threshold of the reference voltage source Vref. Since mid-level precharge is the rule in DRAM data paths and in this case no extra care would be required to reduce current drain during standby. In the bidirectional communications case, then, we would do the same by turning off the transmitter by taking its inputs to the reference voltage source Vref.

The current mode receivers of FIG. 3 would be put into standby quickly by means of an MOS transmission gate in series between the current mode bus CMB and the noninverting input (−) of the differential amplifier Op1. Since the voltage on voltage on the current mode bus CMB is always very near the level of the reference voltage source Vref, only need one type of MOS transistor in the transmission gate is needed. An NMOS transistor would be chosen for its higher gain. If both transmission gates were OFF in the bi-directional line of the current mode bus CMB of FIG. 5 would be floating. Having the current mode bus floating could cause undesirable operation and a high impedance resistor or small, ON, MOS transistor between the current mode bus CMB and the reference voltage source Vref to keep the current mode bus CMB biased near reference voltage source Vref during the OFF times.

The current mode transmitters CMTX1 and CMTX2 are as described above described in FIG. 2. The current mode receivers CMRX1 and CMRX2 are as above described in FIG. 3.

If a bi-directional bus has one wire per direction and two bits per wire, it is possible to have absolutely simultaneous two-way transmission. No bus arbitration or turn around time whatever. This is a much better use of two wires than the conventional two single bit duplex lines, in which the buses and circuitry need frequent turning around.

As will be apparent to those skilled in the art, the current mode transmitter as described in FIG. 2 and the current mode receiver of FIG. 3 and FIG. 4 can be expanded to incorporate more data bits than the two as described. The complexity of the circuitry expands greatly making explanation and implementation difficult. Further, it will also be apparent to those skilled in the art that the current mode transmitter of FIG. 2 and the current mode receiver as described in FIG. 3 and FIG. 4 can be implemented in other MOS transistor technologies, as well as in bipolar junction transistor technology.

While this invention has been particularly shown and described with reference to the preferred embodiments thereof, it will be understood by those skilled in the art that various changes in form and details may be made without departing from the spirit and scope of the invention.

What is claimed is:

1. A data extractor circuit to extract two digital data bits from an unextracted form of the two digital data bits, comprising
   a) a first extraction circuit in communication with a first receiver output terminal to extract the first bit of the two digital data bits;
   b) a midlevel extraction circuit in communication with a second receiver output terminal to provide a midlevel output that is at the second logic state when said second receiver output terminal is at the midlevel between the first logic state and the second logic state; and
   c) a second extraction circuit in communication with the first and second receiver output terminals and the midlevel extraction circuit to extract a second bit of the two digital data bits.

2. The data extractor circuit of claim 1 wherein the first extraction circuit is an inverter circuit.

3. The data extractor circuit of claim 1 wherein the midlevel extraction circuit comprises:
   a) an inversion circuit having a high threshold trip point with an input in communication with to the second receiver output terminal, whereby said inversion circuit has an output that is at the first logic state if the second receiver output terminal is at the second logic state, and is at the second logic state if the second receiver output terminal is at a level less than the high threshold trip point which is greater than the midlevel;
   b) a buffering circuit having a low threshold trip point in communication with the second receiver output terminal, said buffer circuit having an output that is the first logic state if the second receiver output terminal is at the first logic state, and is the second logic state if the second receiver output terminal is at a level greater than the low threshold trip point which is less than the mid level; and
   c) a combinatorial logic circuit having a first input connected to the output of the inversion circuit, a second input connected to the output of the buffering circuit, wherein an output of the combinatorial logic circuit has the first logic state if the second receiver output is not at the midlevel and has the second logic state if the second receiver output is at the midlevel between the first and second logic states.

4. The data extractor circuit of claim 1 wherein, if a first bit and a second bit of the unextracted form of the two digital data bits are at the first logic state, the first bit and the second bit are at the second logic state.

5. The data extractor circuit of claim 1 wherein, if a first bit of the unextracted form of the two digital data bits is at the first logic state and a second bit of the unextracted form of the two digital data bits is at the midlevel between the first logic state and the second logic state, the first bit of the two digital data bits is at the first level and the second bit of the two digital data bits is at the first logic state.

6. The data extractor circuit of claim 1 wherein, if a first bit of the unextracted form of the two digital data bits is at the second logic state and a second bit of the unextracted form of the two digital data bits is at the midlevel between the first logic state and the second logic state, the first bit of the two digital data bits is at the second level and the second bit of the two digital data bits is at the second logic state.

7. The data extractor circuit of claim 1 wherein, if a first bit and a second bit of the unextracted form of the two digital data bits are at the second logic state, the first bit and the second bit are at the first logic state.

8. The data extractor circuit of claim 1 wherein the second extraction circuit performs the logic function $$b_2 = \overline{\alpha} \cdot \overline{\beta} \cdot \overline{\beta}_{MID} + \beta \cdot \beta_{MID}$$

where:
- • is a logical AND,
- + is a logical OR,
- $b_2$ is the second bit of the two digital data bits,
- $\overline{\alpha}$ is a negation of the first receiver output terminal,
- $\overline{\beta}$ is the negation of the second receiver output,
- $\overline{\beta}_{MID}$ is the negation of output of the midlevel extraction circuit,
- $\alpha$ is the first receiver output terminal,
- $\beta_{MID}$ is the output of the midlevel extraction to circuit.

* * * * *